United States Patent Office 2,853,482
Patented Sept. 23, 1958

2,853,482

NEW DIRECT-DYEING DYESTUFFS OF THE TRIAZINE SERIES

Raymond Gunst, Binningen, Switzerland, assignor to Ciba Limited, Basel, Switzerland, a Swiss firm No Drawing. Application November 21, 1955
Serial No. 548,264

Claims priority, application Switzerland
November 25, 1954

5 Claims. (Cl. 260—153)

This invention provides new direct-dyeing dyestuffs of the triazine series which, like, for example, the dyestuff of the constitution (1)

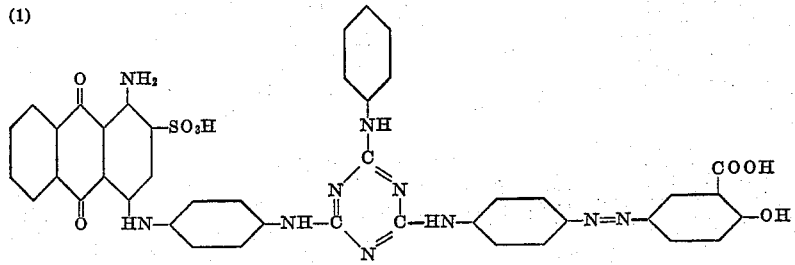

correspond to the general formula (2)

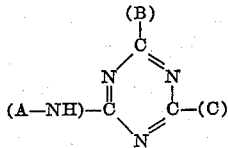

in which (—HN—) represents the radical of a 1-amino-anthraquinone-2-sulfonic acid of which the anthraquinone nucleus is bound in the 4-position through a bridge member and an aryl radical free from substituents containing double bonds to the —NH— group, at least one of the radicals (B) and (C) has the constitution

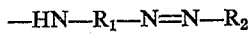
—HN—R$_1$—N=N—R$_2$ and, when only one of the radicals (B) and (C) is of the latter formula, the other of these radicals represents a radical of the above formula A—NH— or an at most bicyclic radical of the benzene series bound through an amino group to the triazine ring, in which formulae R$_1$ represents a benzene radical bound in the 1-position to the azo linkage and in the 4-position to the —HN-group, and R$_2$ represents a benzene radical which contains in para-position to the azo linkage a hydroxyl group and in ortho-position to the hydroxyl group a carboxylic acid group.

The new dyestuffs therefore have the constitution (3)

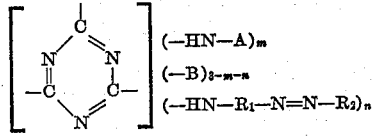

in which (—HN—A) represents the radical of a 1 - aminoanthraquinone - 2 - sulfonic acid of which the anthraquinone nucleus is bound in the 4-position through a bridge member and an aryl radical free from substituents containing double bonds to the —NH— group, R$_1$ represents a benzene radical bound in the 1-position to the azo linkage and in the 4-position to the —NH— group, R$_2$ represents a benzene radical which contains in para-position to the azo linkage a hydroxyl group and in ortho-position to the hydroxyl group a carboxylic acid group, B represents an at most bicyclic radical of the benzene series bound to the triazine ring through an amino group, and $m$ and $n$ each represent the whole number 1 or 2, and the sum of $m+n$ is at most 3.

The invention also includes a process for the manufacture of the above new dyestuffs by exchanging the halogen atoms of a cyanuric halide, advantageously cyanuric chloride, for the radicals of amines, wherein one or two halogen atoms are replaced by the radical of

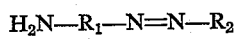

a 1-amino-anthraquinone-2-sulfonic acid which is bound in the 4-position through a bridge member to an aminoaryl radical free from substituents containing double bonds, one or two halogen atoms are replaced by the radical of an amino-monoazo-dyestuff of the formula $$H_2N—R_1—N=N—R_2$$

in which R$_1$ represents a benzene radical bound in the 1-position to the azo linkage and in the 4-position to the H$_2$N— group, and R$_2$ represents a benzene radical which contains in para-position to the azo linkage a hydroxyl group and in ortho-position to the hydroxyl group a carboxylic acid group, and, if a third halogen atom remains, the latter is replaced by the radical of an at most bicyclic amine of the benzene series, and the introduction of a radical of a 1-aminoanthraquinone-2-sulfonic acid of the above constitution is carried out as the final step of the process.

The anthraquinone compounds used as starting materials contain in the 1-position of the anthraquinone nucleus an amino group, in the 2-position a sulfonic acid group and in the 4-position a bridge member, advantageously an —NH— group. The bridge member is bound to an aminoaryl radical which contains no substituents having double bonds, for example, no sulfonic acid, carboxylic acid or nitro groups, but may contain substituents free from double bonds, for example, halogen atoms such as chlorine. Good results are obtained with anthraquinones of the formula (4)

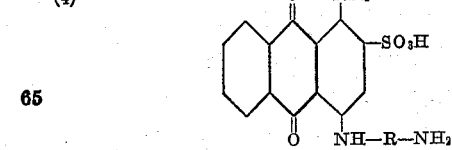

in which R represents an advantageously monocyclic radical of the benzene series, especially a benzene radical, to which both of the amino groups are bound in para-position. There are advantageously used anthraquinone compounds of the formula (5)
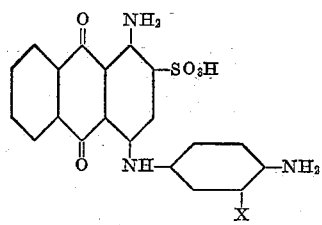

in which X represents a hydrogen atom or a chlorine atom.

As is known in compounds of the type of the Formulae 4 and 5 only the primary amino group bound to the benzene nucleus reacts with a halogen atom of the cyanuric halide. As examples of suitable starting materials of the Formulae 4 and 5 there may be mentioned: 1 - amino - 4 - (3' - chloro - 4' - amino - phenylamino)-anthraquinone-2-sulfonic acid and preferably 1-amino-4-(4'-aminophenylamino)-anthraquinone-2-sulfonic acid.

Before the condensation with an aminoanthraquinone compound of the kind defined above is carried out as a last stage, the cyanuric halide is condensed at least at one halogen atom with an amino-azo-dyestuff of the formula $H_2N-R_1-N=N-R_2$ in which $R_1$ represents a benzene radical bound in the 1-position to the azo linkage and in the 4-position to the amino group, and $R_2$ represents a benzene radical which contains in para-position to the azo for example, alkyl or alkoxy groups of low molecular linkage a hydroxyl group and in ortho-position to the hydroxyl group a carboxylic acid group. The benzene radical $R_1$ and/or $R_2$ may contain further substituents, for example, alkyl or alkoxy groups of low molecular weight such as methyl or methoxy groups or halogen atoms such as chlorine. As examples there may be mentioned the following compounds:

4-amino-4'-hydroxy-1:1'-azobenzene-3'-carboxylic acid,
2 - chloro - 4 - amino-4'-hydroxy-1:1'-azobenzene-3'-carboxylic acid,
2 - methyl - 4-amino-5-methoxy-4'-hydroxy-1:1'-azobenzene-3'-carboxylic acid,
4 - amino - 4'-hydroxy-5'-methyl-1:1'-azobenzene-3'-carboxylic acid and
2 - methyl - 4 - amino-5-methoxy-4'-hydroxy-3'-carboxy-1:1'-azobenzene-5'-sulfonic acid.

As amines of the benzene series which may also be used for the condensation, if 1 molecular proportion of the cyanuric halide reacted only with 1 molecular proportion each of the aminoanthraquinone compound and the aminomonoazo-dyestuff, there come into consideration aminobenzene itself and also aminobenzenes substituted in the nucleus, for example, chloro-aminobenzene or methyl-aminobenzene, and also N-methylaminobenzene, N-ethylaminobenzene, aminobenzene-3- or -4-sulfonic acid or aminobenzene-3- or -4-carboxylic acid, 1-amino-4-hydroxybenzene-3-carboxylic acid, and also condensed amines of the benzene series, such, for example, as 1-(4'-aminobenzoylamino) - 4 - hydroxybenzene-3-carboxylic acid.

By keeping to the order of succession of the various stages of condensation described above the three halogen atoms of the cyanuric halide may be replaced, for example, by radicals of amines as follows:

I. 1 mol of a compound of the formula $$H_2N-R_1-N=N-R_2$$

2 mols of a compound of the formula $H_2N-A$
II. 2 mols of a compound of the formula $$H_2N-R_1-N=N-R_2$$

1 mol of a compound of the formula $H_2N-A$

III. 1 mol of a compound of the formula $$H_2N-R_1-N=N-R_2$$

1 mol of a compound of the formula B
1 mol of a compound of the formula $H_2N-A$ (A, B, $R_1$ and $R_2$ have the meanings given above).

In the manufacture of the new dyestuffs in accordance with the present invention the condensation with the aminoanthraquinone compound is carried out last, but in other respects the condensations may be carried out in different orders of succession. In case I above the condensation product of 1 mol of cyanuric halide with 1 mol of amino-azo-dyestuff may be condensed with 2 mols of the aminoanthraquinone compound or in two stages with 1 mol each of two different aminoanthraquinone compounds.

The condensation product of 1 mol of the cyanuric halide and 2 mols of an amino-azo-dyestuff to be used in case II above may be obtained in a single reaction stage, provided that 2 mols of the same amino-azo-dyestuff are used. In general, however, it is preferable to condense first only one mol of such an amino-azo-dyestuff with the cyanuric halide and to react the product so obtained with a second mol of an amino-azo-dyestuff, especially when two different amino-azo-dyestuffs are used.

In case III it is necessary to use for the condensation with the aminoanthraquinone compound the condensation product of 1 mol of the cyanuric halide with 1 mol of an amino-azo-dyestuff and 1 mol of an amine of the benzene series. Condensation products of this kind are advantageously obtained by first condensing the cyanuric halide with the amino-azo-dyestuff and then with the amino compound of the type B.

All the condensations are advantageously carried out at a pH value within the range of 5 to 7. Depending on the starting materials used it may be of advantage to increase the pH value somewhat from stage to stage. It is generally of advantage to maintain the pH value as nearly constant as possible during each stage, and this may be carried out quite well by continuously testing for free hydrohalic acid and neutralizing it, for example, by means of an alkali carbonate or an alkali hydroxide.

The process of this invention leads to dyestuffs which are distinguished by their unitary composition and the purity of their tins, and also other valuable dyeing properties, for example, their good fastness to light, good fastness to water and washing and also their good levelling capacity.

The dyestuffs of this invention are suitable for dyeing or printing various materials, for example, those of animal origin such as wool, silk or leather, and especially cellulose-containing fibers such as linen, cotton, and artificial silk or staple fibers of regenerated cellulose. When the dyestuffs contain groups capable of forming metal complexes, for example, ortho-hydroxy-carboxylic acid groupings, they may be treated in substance or on the fiber with an agent yielding metal, advantageously an agent yielding copper.

The term "mol" is used herein to mean a molecular proportion, and is not limited to its normal meaning of denoting the number of grams corresponding to the molecular weight of the compound in question. The following examples illustrate the invention, the parts being by weight unless otherwise stated.

*Example 1*

A solution of the sodium salt of 25.7 parts of 4-amino-4' - hydroxy-1:1'-azobenzene-3'-carboxylic acid in 600 parts of water is added to a fine suspension of 18.5 parts of cyanuric chloride in 500 parts of ice water, while stirring vigorously and the temperature is maintained at 0–5° C. by the addition of ice. By simultaneously introducing a dilute solution of sodium hydroxide dropwise the pH value is maintained between 5 and 6. After about 30 minutes the first condensation is finished. By the cautious addition of a dilute solution of sodium hydroxide the pH value is adjusted to 6.5, then 9.3 parts of aminobenzene are added, and the temperature is raised to 40° C. The whole is stirred for 2 hours at that temperature. During this period the pH value usually falls to about 5.5. It is readjusted to 6.5, a solution of the sodium salt of 40.9 parts of 1-amino-4-(4'-aminophenylamino)-anthraquinone-2-sulfonic acid in 1000 parts of hot water is added, and the reaction mixture is gently boiled. The mixture is maintained at the boil under reflux for 48 hours, and care is taken to maintain the pH value between 6.0 and 6.8 by the addition of a dilute solution of sodium hydroxide.

20 parts of sodium carbonate are then added to the reaction mixture and the dyestuff is salted out. It dyes cotton and viscose artificial silk pure yellowish green tints of good fastness to washing and light. By after-treatment with an agent yielding copper the tint of the dyeing changes to yellow green, and the properties of wet fastness are substantially improved. If instead of 40.9 parts of 1-amino-4-(4'-aminophenylamino)-anthraquinone-2-sulfonic acid, 44.4 parts of 1-amino-(3'-chloro-4'-aminophenylamino)-anthraquinone-2-sulfonic acid are used for the condensation at the third chlorine atom of the cyanuric chloride a dyestuff having similar properties is obtained.

If in the second condensation instead of aminobenzene the equivalent quantity of 4-hydroxy-1-aminobenzene-3-carboxylic acid, 1-amino-4-chlorobenzene, 1-amino-2- or -3-methylbenzene, 1-aminobenzene-3- or -4-sulfonic acid, 1 - (4' - aminobenzoylamino) - 4-hydroxybenzene-3-carboxylic acid, N-methylaminobenzene or N-ethylaminobenzene is used, there are obtained similar dyestuffs.

Moverover the 4-amino-4'-hydroxy-1:1'-azobenzene-3'-carboxylic acid may be replaced by 2 - chloro - 4 - amino-4'-hydroxy-1:1'-azobenzene-3'-carboxylic acid,
2-methyl-4-amino-5-methoxy-4'-hydroxy-1:1'-azobenzene-3'-carboxylic acid,
4 - amino - 4'-hydroxy-5'-methyl-1:1'-azobenzene-3'-carboxylic acid or 2-methyl-4-amino-5-methoxy-4'-hydroxy-3'-carboxy-1:1'-azobenzene-5'-sulfonic acid.

*Example 2*

A primary condensation product is prepared from 18.5 parts of cyanuric chloride and 25.7 parts of 4-amino-4'-hydroxy-1:1'-azobenzene-3'-carboxylic acid as described in Example 1. To the reaction mixture there are then added at a pH value of 6.5 a further 25.7 parts of 4-amino-4'-hydroxy-1:1'-azobenzene-3'-carboxylic acid in the form of its sodium salt dissolved in 300 parts of water, and the whole is stirred at 40° C. for 2 hours. By the simultaneous addition of a dilute solution of sodium hydroxide the pH value is constantly maintained between 6.0 and 6.5. There are then added 40.9 parts of 1-amino-4-(4'-aminophenylamino)-anthraquinone-2-sulfonic acid in the form of its sodium salt dissolved in 1000 parts of water, and the reaction mixture is maintained at the gentle boil for 60 hours, while stirring and refluxing.

The reaction mixture is rendered alkaline with 20 parts of sodium carbonate and the dyestuff formed is salted out with sodium chloride. It dyes cellulose fibers pure yellowish green tints which are fast to light, which when after-coppered or produced by dying by the single bath after-coppering process are of a more yellowish shade and possess substantially improved properties of wet fastness.

*Example 3*

A primary condensation product is prepared from 18.5 parts of cyanuric chloride and 25.7 parts of 4-amino-4'-hydroxy-1:1'-azobenzene-3'-carboxylic acid as described in Example 1. To the reaction mixture there are added at a pH value of 6.5, 82 parts of 1-amino-4-(4'-aminophenylamino)-anthraquinone-2-sulfonic acid in the form of its sodium salt dissolved in 1800 parts of water, and the mixture is heated to the boil and maintained at the gentle boil for 48 hours, while stirring and refluxing. By the occasional additions of a dilute solution of sodium hydroxide as the condensation proceeds the pH value is maintained constantly between 6.0 and 6.5.

The reaction mixture is rendered alkaline by the addition of 20 parts of sodium carbonate and the dyestuff formed is salted out with sodium chloride. It dyes cellulose fibers very pure green tints of good fastness to light and washing.

*Example 4*

100 parts of cotton are entered at 40° C., into a dyebath which contains in 3000 parts of water 1 part of the ternary cyanuric chloride condensation product obtainable as described in Example 1, and dyesing is carried on for 1 hour while raising the temperature to 90° C. 30 parts of crystalline sodium sulfate are added and dyeing is continued for a further hour at 90–95° C. The cotton is then rinsed and finished in the usual manner. It is dyed a pure yellowish green tint, and the dyeing is distinguished by its good properties of wet fastness and good fastness to light. By after-treating the dyeing with an agent yielding copper the properties of wet fastness can be still further improved.

What is claimed is:

1. A process for the manufacture of direct dyeing dyestuffs of the triazine series by exchanging the chlorine atoms of cyanuric chloride for the radicals of amines by condensation with the latter in an aqueous medium and at a pH value between about 5 and 7, which comprises replacing at least one and at the most two chlorine atoms, each by a radical of the formula

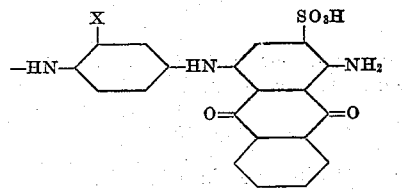

by condensation with an amine of the formula

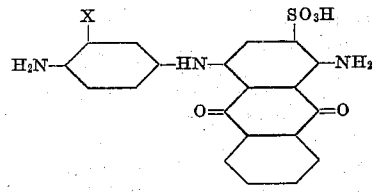

in which X represents a member selected from the group consisting of a hydrogen atom and a chlorine atom, replacing at least one and at the most two chlorine atoms, each by a radical of the formula

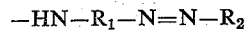

by condensation with an amine of the formula

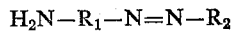

in which $R_1$ represents an aromatic radical containing one carbocyclic six-membered ring and bound in the 1-position to the azo linkage and in the 4-position to the $H_2N$-group and $R_2$ represents an aromatic radical containing in para-position to the azo linkage a hydroxyl group and in ortho-position to the hydroxyl group a carboxylic acid group, and replacing a remaining third chlorine atom by condensation with an aromatic amine containing one carbocyclic six-membered ring, whereby the radical of the last-mentioned amine is bound to the triazine nucleus through the —NH— of the amino group of the amine, the condensation with the amine of the formula

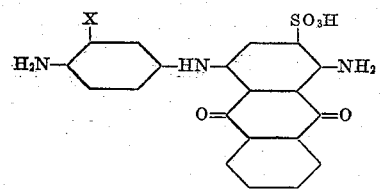

being carried out as the final step.

2. A process for the manufacture of direct dyeing dyestuffs of the triazine series by exchanging the chlorine atoms of cyanuric chloride for the radicals of amines by condensation with the latter in an aqueous medium and at a pH value between about 5 and 7, which comprises replacing at least one and at the most two chlorine atoms, each by a radical of the formula

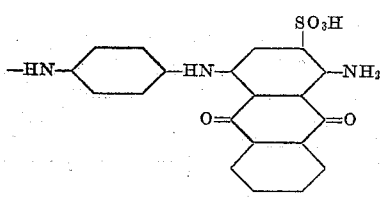

by condensation with the amine of the formula

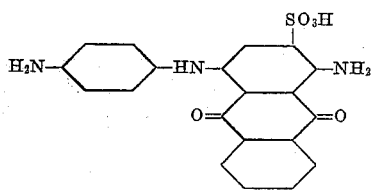

replacing at least one and at the most two chlorine atoms, each by a radical of the formula

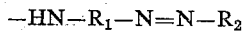

by condensation with an amine of the formula

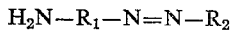

in which $R_1$ represents an aromatic radical containing one carbocyclic six-membered ring and bound in the 1-position to the azo linkage and in the 4-position to the $H_2N$-group, and $R_2$ represents an aromatic radical containing one carbocyclic six-membered ring and containing in para-position to the azo-linkage a hydroxyl group and in ortho-position to the hydroxyl group a carboxylic acid group, and replacing a remaining third chlorine atom by condensation with an aromatic amine containing one carbocyclic six-membered ring, whereby the radical of the last-mentioned amine is bound to the triazine nucleus through the —NH— of the amino group of the amine, the condensation with the amine of the formula

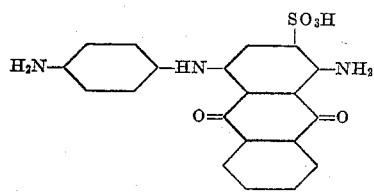

being carried out as the final step.

3. A process for the manufacture of direct dyeing dyestuffs of the triazine series by exchanging the chlorine atoms of cyanuric chloride for the radicals of amines by condensation with the latter in an aqueous medium and at a pH value between about 5 and 7, which comprises replacing one chlorine atom by a radical of the formula

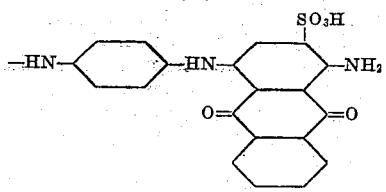

by condensation with the amine of the formula

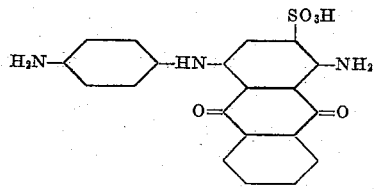

replacing one chlorine atom by a radical of the formula

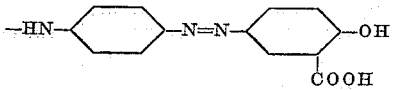

by condensation with the amine of the formula

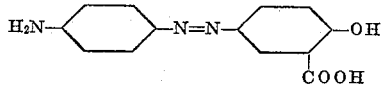

and replacing one chlorine atom by

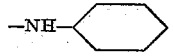

by condensation with amino-benzene, the condensation with the amine of the formula

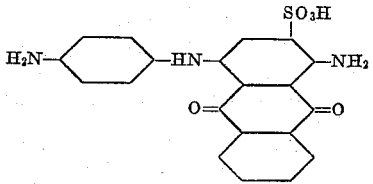

being carried out as the final step.

4. A process for the manufacture of direct dyeing dyestuffs of the triazine series by exchanging the chlorine atoms of cyanuric chloride for the radicals of amines by condensation with the latter in an aqueous medium and at a pH value between 5 and 7, which comprises replacing one chlorine atom by a radical of the formula

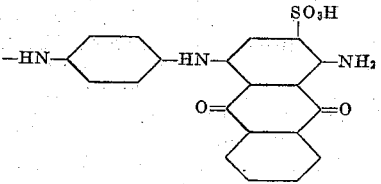

by condensation with the amine of the formula

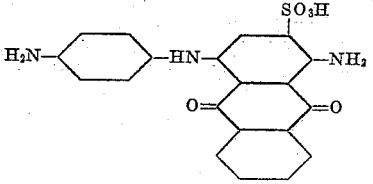

and replacing two chlorine atoms each by the

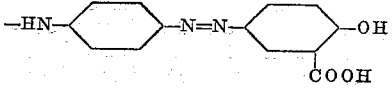

radical, by condensation with the amine of the formula

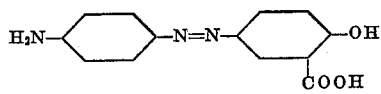

the condensation with the amine of the formula

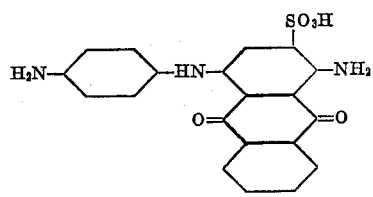

being carried out as the final step.

5. A process for the manufacture of direct dyeing dyestuffs of the triazine series by exchanging the chlorine atoms of cyanuric chloride for the radicals of amines by condensation with the latter in an aqueous medium and at a pH value between 5 and 7, which comprises replacing two chlorine atoms, each by a radical of the formula

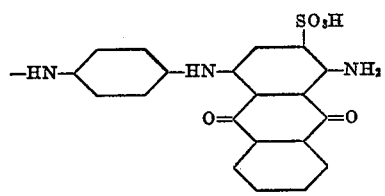

by condensation with the amine of the formula

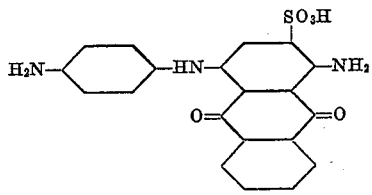

and replacing one chlorine atom by the

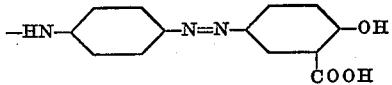

radical by condensation with the amine of the formula

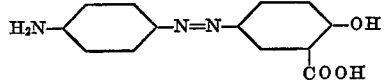

the condensation with the amine of the formula

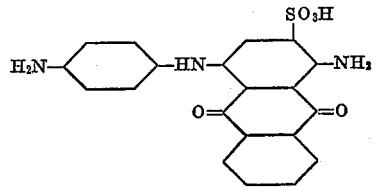

being carried out as the final step.

References Cited in the file of this patent
UNITED STATES PATENTS
2,167,804    Gubler et al. _____ Aug. 1, 1939

UNITED STATES PATENT OFFICE
CERTIFICATE OF CORRECTION

Patent No. 2,853,482                            September 23, 1958

Raymond Gunst

It is hereby certified that error appears in the printed specification of the above numbered patent requiring correction and that the said Letters Patent should read as corrected below.

Column 3, line 31, strike out "for example, alkyl or alkoxy groups of low molecular"; column 4, line 47, for "tins" read -- tints --; column 5, line 36, for "Moverover" read -- Moreover --; line 67, for "dying" read -- dyeing --; column 6, line 18, for "dyesing" read -- dyeing --.

Signed and sealed this 26th day of May 1959.

(SEAL)
Attest:

KARL H. AXLINE                             ROBERT C. WATSON
Attesting Officer                           Commissioner of Patents